(12) United States Patent
Smelquist et al.

(10) Patent No.: US 7,697,572 B2
(45) Date of Patent: Apr. 13, 2010

(54) SURVEY CONTROLLER MULTIPLEXER

(75) Inventors: Ken Smelquist, Edmonton (CA); Robert Gagnon, Edmonton (CA); Mike Westman, Edmonton (CA); Grant Dakin, Edmonton (CA)

(73) Assignee: Spectrum External Line Inspection Technology Inc., Alberta (CA)

( * ) Notice: Subject to any disclaimer, the term of this patent is extended or adjusted under 35 U.S.C. 154(b) by 530 days.

(21) Appl. No.: 11/635,776

(22) Filed: Dec. 7, 2006

(65) Prior Publication Data
US 2007/0263674 A1 Nov. 15, 2007

(30) Foreign Application Priority Data
May 10, 2006 (CA) .................................. 2549786

(51) Int. Cl.
*H04J 3/00* (2006.01)
(52) U.S. Cl. .................. 370/503; 370/535; 370/537; 702/57; 702/189
(58) Field of Classification Search ............ 370/503, 370/535, 537; 702/57, 189
See application file for complete search history.

(56) References Cited
U.S. PATENT DOCUMENTS

| | | | |
|---|---|---|---|
| 6,788,202 B2* | 9/2004 | Holmes et al. | 340/541 |
| 6,859,742 B2* | 2/2005 | Randall et al. | 702/61 |
| 2001/0031003 A1* | 10/2001 | Sawhney et al. | 375/240.14 |
| 2003/0058108 A1* | 3/2003 | Fling et al. | 340/572.1 |
| 2005/0207487 A1* | 9/2005 | Monroe | 375/240.01 |

* cited by examiner

*Primary Examiner*—Ricky Ngo
*Assistant Examiner*—Luat Phung
(74) *Attorney, Agent, or Firm*—Davis & Bujold, P.L.L.C.

(57) ABSTRACT

A multiplexer includes a body having a mechanism, incorporated into the body, for receiving more than one incoming data stream and converting the more than one data stream into a single output stream. An integral time clock is incorporated into the body and is adapted to incrementally time stamp each incoming data stream. The processor on the device also runs software to parse user selected data streams for the purpose of filtering out unnecessary data from the incoming streams, thereby reducing the volume of data and, in particular unwanted data, from being processed and/or logged from the device. The integration of a multimeter for voltage and amperage reading acquisition also reduces the need for external peripheral devices being attached to the device.

2 Claims, 1 Drawing Sheet

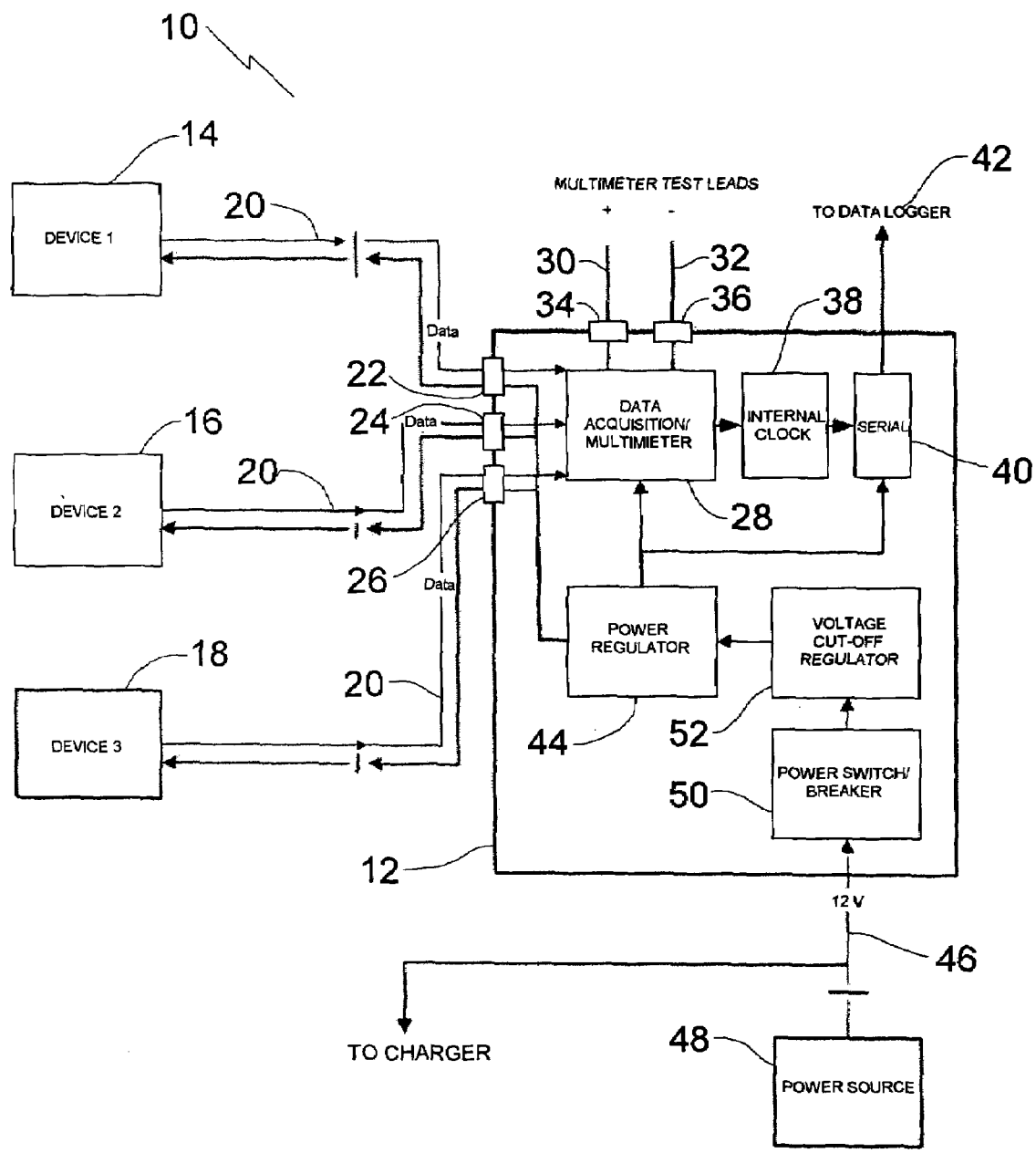
THE FIGURE

SURVEY CONTROLLER MULTIPLEXER

This application claims priority from Canadian Application Serial No. 2,549,786 filed May 10, 2006.

FIELD OF THE INVENTION

The present invention relates to a specialized multiplexer adapted to receive, filter, and process multiple data streams from multiple instruments, and consolidate the data streams into one common stream. The device also has an integrated multimeter for taking voltage and amperage readings, and provides power distribution to the various devices connected to the survey controller.

BACKGROUND OF THE INVENTION

Multiplexers receive multiple data streams and pass the data on to a data logger as a single data stream. Although the multiplexer passes data on to the data logger in the order it is received, the data logger can experience problems when integrating the data due to differences in the frequencies of the various data streams. Logging data from the multiplexer can be complicated by the large volumes of data streaming from certain devices that produce continuous data streams, not required readings only.

SUMMARY OF THE INVENTION

According to the present invention there is provided a multiplexer which includes a body with means being incorporated into the body for receiving more than one incoming data stream and converting the more than one data stream into a single output stream. An integral time clock is incorporated into the body, which is adapted to incrementally time stamp each incoming data stream.

BRIEF DESCRIPTION OF THE DRAWINGS

These and other features of the invention will become more apparent from the following description in which reference is made to the appended drawing, the drawing is for the purpose of illustration only and is not intended to in any way limit the scope of the invention to the particular embodiment or embodiments shown, wherein:

The FIGURE is a schematic diagram of a multiplexer constructed in accordance with the teachings of the present invention.

DETAILED DESCRIPTION OF THE PREFERRED EMBODIMENT

The preferred embodiment, a multiplexer generally identified by reference numeral 10, will now be described with reference to The FIGURE.

Structure and Relationship of Parts:

Referring to The FIGURE, multiplexer 10 includes a body 12. There is means incorporated into body 12 for receiving more than one incoming data stream and converting the more than one data stream into a single output stream. For example, there is shown three devices 14, 16, and 18, where each has a data cable 20. Data cables 20 are plugged into connectors 22, 24 and 26, respectively, or otherwise connected, as is known in the art. The data is then transmitted to the data acquisition block 28. In addition, data acquisition block 28 receives data from multimeter test leads 30 and 32 which are connected to connectors 34 and 36, where data acquisition block 28 is adapted to act as a multimeter as well. There is also means incorporated into body 12 for filtering each incoming data stream to reduce the volume of the incoming data stream. This function may be performed by data acquisition block 28, or another component if desired. The filtering means limits each incoming data stream to pre-selected threshold ranges. An integral time clock 38 is incorporated into body 12 and is adapted to incrementally time stamp each incoming data stream as it is received from data acquisition block 28. A serial block 40 is used to serialize the data before it is transmitted to an external data logger 42.

Multiplexer 10 is powered using a power regulator 44 which is incorporated into body 12. Power to operate instruments such as devices 14, 16 and 18 as well as the current through test leads 30 and 32 that produce the incoming data stream passes though power regulator 44 to the instruments. Multiplexer 10 is connected to a power source 48 by a single cable 46, and then each device 14, 16 and 18 are powered through data cables 20. Power regulator 44 is powered by any suitable power source, such as a rechargeable battery, solar panel or other power source 48, and is protected by a power switch/breaker 50, as well as a voltage cut-off regulator 52.

The multiplexer merges the different types of survey data, such as Electromagnetic pipe and cable locators, Laser survey devices, Inertial navigation units, electrical test devices, GPS, and SONAR (represented by devices 14, 16 and 18, although more or fewer devices could be present) into a single data stream to the data logger 42 or pocket PC. This making significant improvements to the collection of data and streamlining the process to a point where surveys that were formerly conducted independently can be completed in a single survey instead of 3 or 4. Other features that are used by the multiplexer include:

1. Time Stamping—As different peripheral devices would collect and send data at different frequencies, generally between 1 to 10 Hz, the frequency differences between devices began to introduce margins for error because the difference between what one device submitted and another could not be calculated. Time stamping by logging device has been used, but this introduced another problem of processor lag. Thus, the incremental time clock 38 is integrated into the multiplexer 10 to incrementally and accurately time stamp or otherwise index every data string as it enters the multiplexer 10. The time stamping now makes it possible to accurately calculate the time difference between the different peripheral devices. With numerous devices sending data at 10 Hz or faster, there is a requirement for data timing/indexing resolution of 100 Hz or better.

2. Custom Data Filtration—In all cases each peripheral device 14, 16, and 18 uses its own predetermined data string as defined by the manufacturer. Likewise, only some of the data submitted by each device is required for a successful survey. Custom filtration is therefore used to reduce the data flow to the minimum required for successful surveys. This is done by using predetermined thresholds which are then applied to custom fields in each data string and accordingly are filtered off by the multiplexer 10 to deterministically reduce the amount of data strings sent to the data logger 42. Data filtering is accomplished by parsing the incoming data strings and filtering on one or more specific readings from the corresponding instrument to allow comparison to threshold values that establish whether or not the reading is needed.

3. Cabling—to centralize one common power supply for all peripheral devices, to allow for single point of charging, single point for power on/off switching, and to reduce the amount of weight carried by a technician for the integration of multiple surveys into one device, two features were included:

a. Power integration—To help eliminate cables, power to each peripheral was routed through the multiplexer 10. Typical configuration would require a data cable to the multiplexer and an additional power cable to a power source for each device. Now a single power cable 54 is run from the power source 48 to the multiplexer 10. The power is then distributed to each peripheral from the multiplexer to each device using the data cables 20.

b. Multi-meter—built-in multi-meter represented by leads 30 and 32 to eliminate one peripheral device and further reduce cables.

Operation:

The multiplexer is provided as described above with reference to The FIGURE. Multiple devices 14, 16 and 18 are connected to connections 22, 24 and 26 (more may be provided if necessary) are connected using data cables 20. Data cables 20 are also used to power each device 14, 16 and 18. Multiplexer 10 is powered, in turn, by power source 48. Data received by devices 14, 16 and 18 or multimeter leads 30 and 32 is sent to data acquisition block 28. Data that is to be recorded is then streamed to internal clock 38 which time stamps the data. The data is then serialized by block 40, and transmitted to data logger 42.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A multiplexer comprising:

a body to be carried by a surveyor;

more than one survey sensor connected to the body, and each of the survey sensor comprising:
- at least one location sensor for sensing the relative location of the body, the exact location, or both;
- a pipeline sensor for sensing the depth of a buried pipeline;

a receiver incorporated into the body for receiving an incoming data stream from each survey sensor and converting the data streams into a single output stream;

a filter for filtering the incoming data streams, prior to converting the data streams into a single output stream, to reduce a volume of the incoming data streams, the filter selecting data strings based on pre-selected threshold ranges from each survey sensor data stream, and filtering out a remainder;

a power source and power regulator incorporated into the body, and the power source powering each survey sensor via the power regulator;

an integral time clock incorporated into the body, the integral time clock incrementally time stamping each incoming data string; and a data output connected to a portable electronic device.

2. The multiplexer as defined in claim 1, wherein a multimeter is incorporated into the body.

* * * * *